(12) United States Patent
Kifuku

(10) Patent No.: US 7,358,690 B2
(45) Date of Patent: Apr. 15, 2008

(54) MOTOR CONTROL APPARATUS

(75) Inventor: Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/074,758

(22) Filed: Mar. 9, 2005

(65) Prior Publication Data

US 2006/0055348 A1    Mar. 16, 2006

(30) Foreign Application Priority Data

Sep. 10, 2004   (JP)   ............................ P2004-263541

(51) Int. Cl.
*H02P 3/00*   (2006.01)

(52) U.S. Cl. .................. 318/62; 318/101; 318/254; 318/272; 318/432; 318/434

(58) Field of Classification Search .................. 318/62, 318/101, 254, 272, 700–800, 432–434
See application file for complete search history.

(56) References Cited

U.S. PATENT DOCUMENTS

| | | | | |
|---|---|---|---|---|
| 4,084,219 A | * | 4/1978 | Furukawa et al. ............. | 363/19 |
| 4,335,345 A | | 6/1982 | Converse et al. | |
| 4,608,958 A | * | 9/1986 | Sakakibara et al. .......... | 123/605 |
| 4,875,539 A | * | 10/1989 | Abukawa et al. ............ | 180/446 |
| 5,179,842 A | * | 1/1993 | Kanazawa .................... | 62/158 |
| 5,198,743 A | | 3/1993 | McClure et al. | |
| 5,506,775 A | * | 4/1996 | Tsurushima et al. .......... | 701/45 |
| 5,552,684 A | * | 9/1996 | Wada et al. ................. | 318/293 |
| 5,703,447 A | * | 12/1997 | Higuchi ....................... | 318/139 |
| 5,717,310 A | * | 2/1998 | Sakai et al. ................. | 307/10.1 |
| 5,796,175 A | * | 8/1998 | Itoh et al. ................... | 307/10.1 |
| 6,262,545 B1 | * | 7/2001 | Yamamoto ................... | 318/254 |
| 6,459,972 B2 | * | 10/2002 | Kodaka et al. ............... | 701/43 |
| 6,600,983 B2 | | 7/2003 | Kifuku | |
| 6,690,586 B2 | | 2/2004 | Hosotani et al. | |
| 6,815,927 B2 | * | 11/2004 | Ikeda .......................... | 318/800 |
| 6,987,371 B2 | * | 1/2006 | Kifuku ....................... | 318/432 |
| 2001/0007419 A1 | | 7/2001 | Tanaka et al. | |
| 2002/0069003 A1 | | 6/2002 | Kifuku | |

FOREIGN PATENT DOCUMENTS

| | | |
|---|---|---|
| JP | 11-332733 A | 12/1999 |
| JP | 2001-142362 A | 5/2001 |
| JP | 2002-166837 A | 6/2002 |
| JP | 2002-354789 A | 12/2002 |

* cited by examiner

*Primary Examiner*—Lincoln Donovan
*Assistant Examiner*—Michael Brandt
(74) *Attorney, Agent, or Firm*—Sughrue Mion, PLLC

(57) ABSTRACT

In a motor control apparatus in which a higher voltage is directly applied to a driving unit for a motor from a battery and a lower voltage stepped down by a switching regulator from the battery is also supplied to a control unit, the switching regulator is started its switching by a starting signal supplied from the outside of the motor control apparatus and is stopped its switching by the first stopping signal from the outside of a motor control apparatus and the second stopping signal derived from the control unit.

16 Claims, 3 Drawing Sheets

FIG.3 *Prior Art*
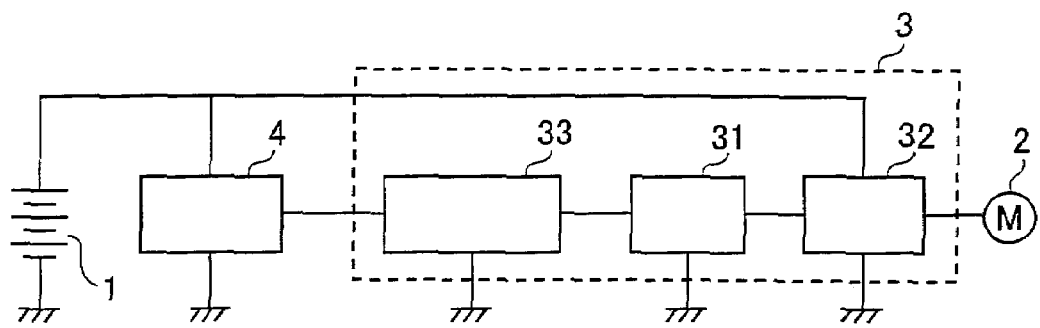

MOTOR CONTROL APPARATUS

BACKGROUND OF THE INVENTION

1. Field of the Invention

The present invention relates to a motor control apparatus, in particular, to a vehicle-steering control apparatus such as an electric power steering apparatus and an automatic steering apparatus for automobiles.

2. Description of the Prior Art

Heretofore, it has been commonly conducted to increase power supply voltages in order to raise an efficiency of large-power vehicular equipment. Although power supply (battery) voltages in passenger cars, for example, has generally been set at 12V, power supply voltages in commercial cars such as trucks has been set at 24V as they need a greater power supply. It has also been considered to set power supply voltages at 42V even in passenger cars as the number of equipment mounted therein increases. Moreover, in electric cars, a power supply of high voltages as much as 200V or 300V is even mounted.

Whereas, a microcontroller or an operational amplifier implemented in a control device for controlling a variety of vehicular equipment has been generally used at low voltage such as 3.3V, 5V, and 8V, etc. Applying high power supply voltage to such a control device causes a greater voltage drop in a power supply circuit, resulting in greater loss in the circuit.

There has been a known electric power steering apparatus, as a motor control apparatus to be mounted in a high voltage car system described above, as disclosed in Japanese Patent Laid-open Publication JP 2002-166837 (U.S. Pat. No. 6,600, 983). In the above electric power steering apparatus, as shown in FIG. 3, a battery 1 supplies a high voltage power directly to a driving means 32 for a motor 2 and also supplies a lower voltage stepped down by a switching regulator 4 to a control unit 31 including a microcontroller and others through a series regulator 33, thereby a steep voltage drop at the series regulator 33 can be suppressed, even in a vehicle equipped the battery 1 with relatively higher voltage such as 24V,36V, preventing a power loss in the power supply circuit of the control unit 31.

Whereas, the driving means 32 is directly power-supplied from the battery 1, therefore the driving means 32 can be driven with higher efficiency to realize the control device with higher efficiency, as a whole.

However, there has been the problem in the aforementioned electric power steering apparatus that a power consumption in the battery becomes larger because the switching regulator 4 has been always operated, notwithstanding the control unit 31 comprising the microcontroller and others is operated or not, supplying electric power continuously to the series regulator 33. Once the switching regulator 4 started its self-excited oscillation, for example, its oscillation sustains even after switching off of an ignition switch, resulting in power consumption in the battery 1 even during an off-time of the ignition switch.

SUMMARY OF THE INVENTION

The invention was developed to resolve the above-described problems, and it is therefore an object of the invention to provide a motor control apparatus, capable of reliably reducing power consumption on standby by constituting so that the control unit is completely prevented from being supplied the power when the control unit comprising a microcontroller and others is not operated.

To achieve the above object, the first aspect of the motor control apparatus of the present invention in which a battery supplies a voltage power directly to a driving means for a motor and also supplies a lower voltage stepped down by a switching regulator to a control unit comprising a microcontroller and others, is constituted so that the switching regulator is started its switching by a starting signal supplied from the outside of the motor control apparatus and is stopped its switching by the first stopping signal from the outside of a motor control apparatus and the second stopping signal derived from the control unit.

The second aspect of the motor control apparatus of the present invention in which a battery supplies a voltage power directly to a driving means for a motor and also supplies a lower voltage stepped down by a switching regulator to a control unit comprising a microcontroller and others, is constituted so that the switching regulator is started its switching by a starting signal derived from the control unit and is stopped its switching by the stopping signal derived from the control unit.

According to the motor control apparatus of the present invention, a power consumption in the control unit comprising a microcontroller and others can be substantially reduced and a power consumption on standby can be also reduced by constituting so that the control unit is completely prevented from being supplied the power when the control unit is not operated.

DESCRIPTION OF THE DRAWINGS

FIG. 3 is a circuit diagram of a vehicle-steering control apparatus in a conventional art.

DESCRRIPTION OF THE PREFERRED EMBODIMENTS

Embodiment 1

Figure 1:
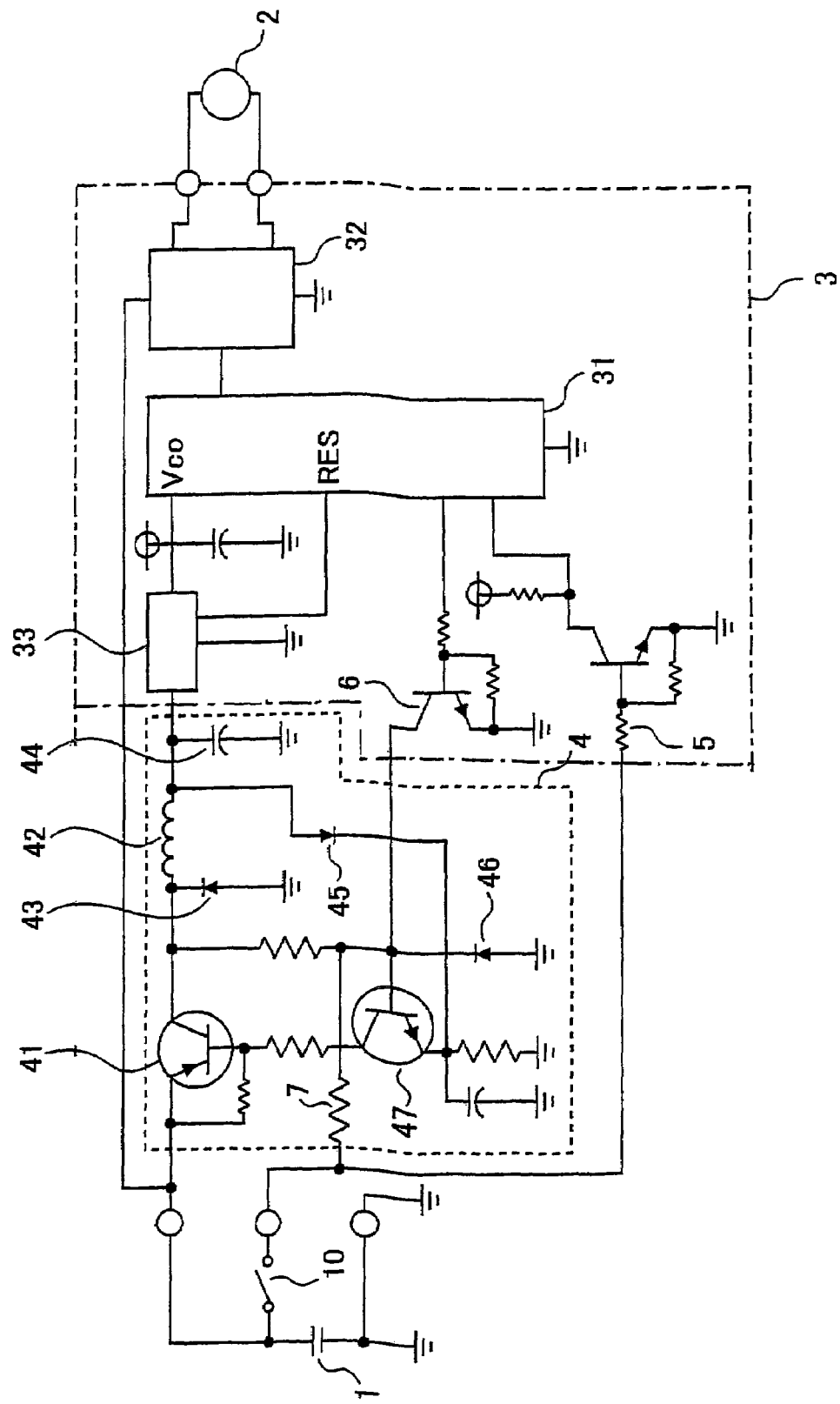
FIG. 1 is a circuit diagram of a vehicle-steering control apparatus according to the first embodiment of the invention.

An embodiment of the present invention will now be described. FIG. 1 shows a first embodiment of the invention, wherein reference numeral 1 denotes a power supply such as a battery; 2, a motor for increasing driver's steering power; 3, a control unit for controlling the motor 2. The control unit 3 is, same as the prior art shown in FIG. 3, equipped with a control means 31 comprising a microcontroller and others, a driving means 32 for driving the motor 2 according to the instruction from the control means 31, and a series regulator 33. The battery 1 supplies a voltage power directly to a driving means 32 for a motor 2 and also supplies a lower voltage stepped down by a switching regulator 4 comprising a DC-DC converter to a control means 31 comprising a microcontroller and others. The switching regulator 4 shown in this embodiment is constituted by a self excited step down-chopper circuit. The series regulator 33 is operated so as to convert a voltage from the switching regulator 4 to the other stabilized voltage predetermined and to generate a reset signal at a low voltage state. Reference numeral 10 denotes an ignition switch for serving a starting signal or a stopping signal from the outside of the control unit 3. The switching regulator 4 is provided with a first transistor 41 for interrupting intermittently the voltage from the battery 1, a coil 42 for filtering the intermittent voltage from the collector of the first transistor 41, a first diode 43 for overspill a current of the coil 42, a capacitor 44 for filtering the intermittent voltage from the collector of the transistor 41 together with the coil 42, a second diode 45 for inputting a feedback signal from an output voltage of the switching regulator 4 filtered by the coil 42 and the capacitor 44 to a second transistor 47 which will be discussed later, a zener diode 46 for generating a referential signal to determine a output voltage of the switching regulator 4, and the second transistor 47 for switching the first transistor 41 to take place a chopper operation based on both of the feedback signal from the second diode 45 and the referential signal from the zener diode 46. The preferred embodiment 1 according to this invention is further provided with a third transistor 5 for inputting the starting or stopping signal generated by the ignition switch 10 to a microcontroller 31, and a fourth transistor 6 for stopping an oscillation of the switching regulator 4 by the signal from the microcontroller 31.

Now the operation of the above embodiment will be described with reference to FIG. 1. When the ignition switch 10 is closed, the battery 1 supplies a base current to the second transistor 47 via a resister 7 to bring it into conduction, thereby the battery 1 supplies a base current to the first transistor 41 to bring it into conduction. Upon turning on of the transistor 41, the current flows from the collector of the first transistor 41 to the capacitor 44 via the coil 42, causing the output voltage of the switching regulator 4 to rise. The output voltage of the switching regulator 4 is given to the emitter of the second transistor 47 via the second diode 45 as a feedback signal. The constant voltage by the zener diode 46 is applied to the base of the second transistor 47 as a reference signal, and is compared with the feedback signal to perform a feedback controlling. In detail, when the voltage of the reference signal is higher than that of the feedback signal, the second transistor 47 is turned on to keep the first transistor 41 on, on the contrary, when the voltage of the reference signal is lower than that of the feedback signal, the second transistor 47 is turned off to bring the first transistor 41 to out of conduction.

The intermittent voltage generated by on/off operation of the first transistor 41 is given to the coil 42, and while the first transistor 41 is turned off, a current flowing in the coil 42 is refluxed through the first diode 43 and capacitor 44 to charge up the capacitor 44 and filtering function is taken place. As understood from the foregoing operation, if the forward voltage of the second diode 45 is equal to the voltage between the base and emitter of the second transistor 47, the output voltage of the switching regulator 4 is feedback controlled so as to be equal to the voltage of the zener diode 46. The voltage of the switching regulator 4 is then given to the series regulator 33 wherein it is stabilized to the predetermined value.

The stabilized voltage from the series regulator 33 is supplied to the microcontroller 31 as its power source and is also supplied to RES terminal of the microcontroller 31 as a reset signal. The microcontroller 31 supplied the power source and the reset signal from the series regulator 33 performs a given operation and provides a given instruction to the motor driving circuit 32 for driving the motor 2.

An operation for reducing power consumption on standby will be described hereafter. While the ignition switch 10 is closed, the battery 1 supplies a base current to the third transistor 5 to bring it into conduction, thereby the microcontroller 31 is given a starting signal to start controlling a variety of vehicular equipment therein. In this state, when the ignition switch 10 is opened, the third transistor 5 is brought to turn off to give the microcontroller 31 a stopping signal. As the result of it, the microcontroller 31 decelerates the motor 2 at an appropriate deceleration to bring it to a stop, and a given stopping process is taken place, for example, the executed data is stored in a nonvolatile memory implemented in the microcontroller 31. After a lapse of time necessary for the stopping process, the microcontroller 31 provides a stopping signal to the base of the fourth transistor 6 to bring it into conduction. As the result, the second transistor 47 and the first transistor 41 are turned off to bring the oscillation of the switching regulator 4 into stopping, thereby causing to stop a power supply to the microcontroller 31 from the battery 1.

According to this embodiment of the invention, the motor controlling apparatus is constituted so that the series regulator 33 which supplies power to the microcontroller 31 is supplied with electric power via the switching regulator 4 from the battery 1, therefore it is possible to reduce power loss in the microcontroller 31.

Furthermore, the motor controlling apparatus according to this embodiment is constituted so that the microcontroller 31 is not supplied with power when the microcontroller 31 is inoperative, therefore it is possible to reduce a power consumption on standby of the motor control apparatus. In addition, the motor controlling apparatus according to this embodiment is constituted so that the battery 1 supplies a voltage power directly to a driving means 32 and also supplies a voltage power to the microcontroller 31 through a switching regulator 4, therefore, as in the prior art, it is possible to reduce a power loss for the microcontroller 31, and it is also possible to supply a high voltage to the motor 2, improving over all efficiency. Although the switching regulator 4 is embodied by the step-down chopper circuit in Embodiment 1, it is, of course, embodied by the step-up chopper circuit, in this case, it is possible for the microcontroller 31 to operate with stability even when the battery voltage is decreased.

Embodiment 2

Figure 2:
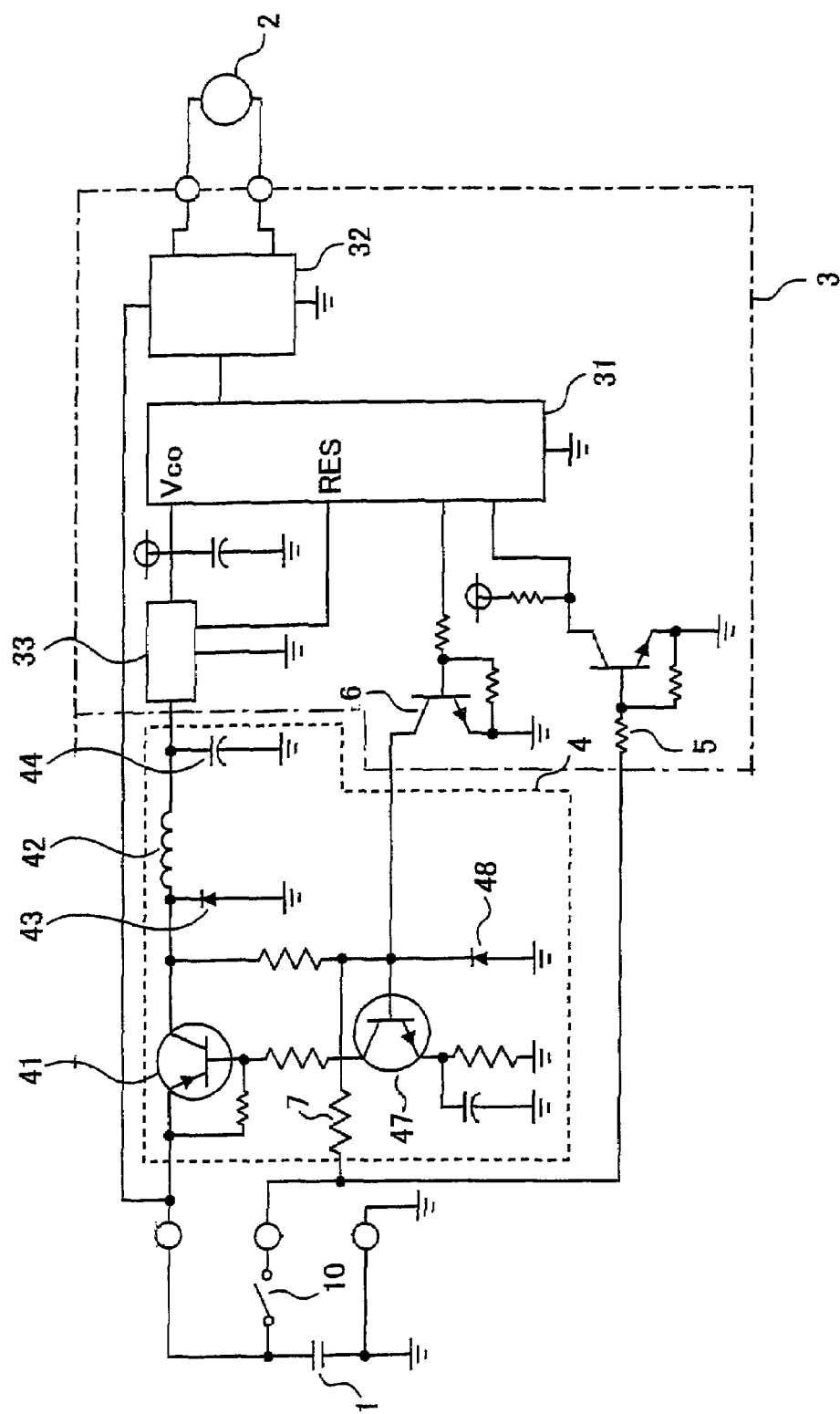
FIG. 2 is a circuit diagram of a vehicle-steering control apparatus according to the second embodiment of the invention.

The second embodiment of the present invention will next be described. FIG. 2 shows an example of the switching regulator 4 constructed of separately excited chopper circuit. Like reference characters designate like component parts in the first embodiment of the invention. This embodiment is different from the first embodiment in the point that there is no second diode 45 through which the output voltage of the switching regulator 4 filtered with the coil 42 and the capacitor 44 is input to the second transistor 47 as a feedback signal. Other point different from the first embodiment is that there exists the resister 48 instead of the zener diode 46 for generating a reference signal. The rest of the components are the same with the first embodiment so that no explanation about those would be necessary.

The operation of this circuit will next be explained. When the ignition switch 10 is closed, the battery 1 supplies a base current to the second transistor 47 via a resister 7 to bring it into conduction, thereby a current flows from the base of the first transistor 41 to the collector of the second transistor 47 to bring the first transistor 41 into conduction. Upon turning on of the transistor 41, the electric current flows from the collector of the first transistor 41 to the capacitor 44 via the coil 42, causing the output voltage of the switching regulator 4 to rise. The output voltage of the switching regulator 4 is next given to the series regulator 33 in which the output voltage is stabilized to the predetermined voltage value.

The series regulator 33 applies the predetermined voltage to the microcontroller 31 as its power source and also gives a reset signal to the microcontroller 31 at a time of a voltage drop or a starting operation.

The switching regulator 4 is not yet switched in operation at this moment and the first transistor 41 is in a conducting state at its saturated region. Therefore, the voltage difference between the battery voltage and the power source voltage Vcc to the microcontroller 31 is applied to the series regulator 33, resulting in a higher power loss.

However, immediately after the starting operation of the microcontroller 31, the microcontroller 31 begins to turn on and off the fourth transistor 6 at a given frequency and thereby turns on and off the first transistor 41 via the second transistor 47. The voltage generated intermittently by switching of the first transistor 41 is given to the coil 42, and while the first transistor 41 is turned off, a current flowing in the coil 42 is circulated through the first diode 43 to occur the accumulation of charge in a capacitor 44 for filtering.

With an aforementioned operation, the output voltage of the switching regulator 4, in a case where the duty ratio of switching on the first transistor 41 is 50%, for example, is cut in approximately half of the voltage of the battery 1.

While the ignition switch 10 is closed, on the other hand, the third transistor 5 is turned on to give a starting signal to the microcontroller 31. When the ignition switch 10 is opened, the third transistor 5 is turned off to give a stopping signal to the microcontroller 31. The microcontroller 31 decelerates the motor 2 at an appropriate deceleration to bring it to a stop, and a given process for stopping is taken place in the microcontroller 31, for example, the executed data is stored in a nonvolatile memory implemented in the microcontroller 31.

According to this embodiment of the invention, the motor control apparatus is constituted so that the switching regulator 4 is constructed of separately excited chopper circuit which is directly controlled by the microcontroller 31, and the output voltage of the switching regulator 4 is controlled with the open-loop, therefore it is possible to have a same effects with the first embodiment, and in addition to it, to deliver substantial reduction in component count.

Whereas many alterations and modifications of the present invention will no doubt become apparent to a person of ordinary skill in the art after having read the foregoing description, it is to be understood that the particular embodiment shown and described by way of illustration is in no way intended to limit the scope of the claims which in themselves recite only those features regarded as essential to the invention.

What is claimed is:

1. A motor control apparatus comprising:
a power source;
a motor driving unit supplied with power from the power source;
a switching regulator supplied with power from the power source; and
a control unit for controlling the motor driving unit and supplied with power from the switching regulator;
wherein said switching regulator stars switching by a first starting signal supplied from the outside of the motor control apparatus and upon the disappearance of the first starting signal, the switching regulator continues switching by a second starting signal derived from the control unit until both the first starting signal and the second starting signal disappear.

2. A motor control apparatus according to claim 1, wherein the control unit is supplied with power from the switching regulator via a series regulator for establishing a given stabilized voltage.

3. A motor control apparatus according to claim 1, wherein the switching regulator comprises a first transistor for interrupting the power source, a filtering circuit for filtering the output voltage of the first transistor, a first diode for circulating a current flowing in a coil in the filtering circuit, a second diode for feed-backing the filtered output voltage, a zener diode for generating a reference signal, and a second transistor for switching the first transistor to make it chopper operation based on the feedback signals from the second diode and the reference signals from the zener diode.

4. A motor control apparatus according to claim 1, wherein the first starting signal is an on signal of an ignition switch.

5. A motor control apparatus according to claim 4, further comprising a third transistor for inputting the first starting signal from the ignition switch into the control unit, and a fourth transistor for starting or stopping an oscillation of the switching regulator by a second starting signal from the control unit.

6. A motor control apparatus according to claim 1, wherein the switching regulator comprises a voltage step-up or step-down chopper circuit.

7. A motor control apparatus comprising:
a power source;
a motor driving unit supplied with power from the power source;
a switching regulator supplied with power from the power source; and
a control unit for controlling the motor driving unit and supplied with power from the switching regulator;
wherein said switching regulator is operated without switching by a first starting signal from the outside of the motor control apparatus and starts switching by a second starting signal derived from the control unit and continues switching until the second starting signal disappears.

8. A motor control apparatus according to claim 7, wherein the control unit is supplied with power from the switching regulator via a series regulator for establishing a given stabilized voltage.

9. A motor control apparatus according to claim 7, wherein the switching regulator comprises a first transistor for interrupting the power source, a filtering circuit for filtering the output voltage of the first transistor, a diode for circulating a current flowing in a coil in the filtering circuit, and a second transistor for switching the first transistor to make it chopper operation based on the signals from the control unit.

10. A motor control apparatus according to claim 7, further comprising a third transistor for inputting the first starting signal from an ignition switch into the control unit, and a fourth transistor for switching the switching regulator by the second starting signal from the control unit.

11. A motor control apparatus according to claim 7, wherein the first starting signal is an on-signal of the ignition switch.

12. A motor control apparatus according to claim 7, wherein the switching regulator is a voltage step-up or step-down chopper circuit.

13. The motor control apparatus according to claim 1, wherein the first starting signal is an on signal of an ignition switch and wherein the second starting signal instructs the switching regulator to continue switching when the ignition switch is off.

14. The motor control apparatus according to claim 13, further comprising a transistor between the control unit and the switching regulator for supplying the second starting signal to the switching regulator.

15. The motor control apparatus according to claim 7, wherein the first starting signal is an on signal of an ignition switch and wherein the second starting signal instructs the switching regulator to start switching when the ignition switch is off.

16. The motor control apparatus according to claim 15, further comprising a transistor between the control unit and the switching regulator for supplying the second starting signal to the switching regulator.

* * * * *